(12) United States Patent
Kim

(10) Patent No.: US 6,337,697 B1
(45) Date of Patent: Jan. 8, 2002

(54) METHOD FOR SCROLLING AUTOMATICALLY ON A DISPLAY DEVICE AND DEVICE THEREFOR

(75) Inventor: Hyung-gi Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/133,316

(22) Filed: Aug. 13, 1998

(30) Foreign Application Priority Data

Dec. 29, 1997 (KR) .............................. 97-76407

(51) Int. Cl.[7] .............................. G09B 5/34
(52) U.S. Cl. .............. 345/784; 345/785; 345/786; 345/787; 345/830; 345/973; 345/974; 345/204
(58) Field of Search .................. 345/118, 121, 345/123, 126, 341, 439, 973, 784–787, 830, 974, 204

(56) References Cited

U.S. PATENT DOCUMENTS

| | | | |
|---|---|---|---|
| 5,111,426 A | * 5/1992 | Bergstresser, Sr. et al. | 707/4 |
| 5,239,665 A | * 8/1993 | Tsuchiya | 395/326 |
| 5,493,641 A | * 2/1996 | Brown | 395/341 |
| 5,606,344 A | * 2/1997 | Blaskey et al. | 345/115 |
| 5,611,060 A | * 3/1997 | Belfiore et al. | 395/341 |
| 5,625,782 A | * 4/1997 | Soutome et al. | 395/341 |
| 5,657,434 A | * 8/1997 | Yamamoto et al. | 395/133 |
| 5,749,082 A | * 5/1998 | Sasaki | 707/508 |
| 5,798,749 A | * 8/1998 | Minematsu et al. | 345/123 |
| 5,872,566 A | * 2/1999 | Bates et al. | 345/341 |
| 5,874,936 A | * 2/1999 | Berstis et al. | 345/123 |
| 6,147,670 A | * 11/2000 | Rossmann | 345/123 |

FOREIGN PATENT DOCUMENTS

| | | |
|---|---|---|
| EP | 0 813 138 A1 | 12/1997 |
| JP | 63-27877 | 2/1988 |
| JP | 3-282881 | 12/1991 |
| JP | 4-84195 | 3/1992 |
| JP | 4-309118 | 10/1992 |
| JP | 7-295937 | 11/1995 |
| JP | 9-69037 | 3/1997 |
| JP | 9-73387 | 3/1997 |
| JP | 9-198033 | 7/1997 |
| WO | WO 94/23405 | 10/1994 |

* cited by examiner

*Primary Examiner*—Bipin Shalwala
*Assistant Examiner*—Vincent E. Kovalick
(74) *Attorney, Agent, or Firm*—Staas & Halsey LLP

(57) ABSTRACT

An automatic scrolling method for showing a document which is larger than a screen of an information device and device therefor. The method includes the steps of (a) displaying a portion of the document located at the beginning of the document, (b) displaying another portion of the document shifted from a previously displayed portion by a predetermined horizontal displacement every predetermined period until the right end of the document is displayed, (c) displaying another portion of the document shifted by a predetermined vertical displacement and including a left end of the document when the right end of the document is displayed, and (d) repeating the steps (b) and (c) until all of the contents of the document are displayed. Preferably, the information device is a hand-held portable information terminal.

23 Claims, 2 Drawing Sheets

METHOD FOR SCROLLING AUTOMATICALLY ON A DISPLAY DEVICE AND DEVICE THEREFOR

CROSS-REFERENCE TO RELATED APPLICATIONS

This application claims the benefit of Korean Application No. 97-76407, filed Dec. 29, 1997, in the Korean Patent Office, the disclosure of which is incorporated herein by reference.

BACKGROUND OF THE INVENTION

1. Field of the Invention

The present invention relates to an information display method on a display device and a device therefor, and more particularly, to a method for scrolling displayed information automatically.

2. Description of the Related Art

Typically, the size of a document displayed on a display device of an information processing system, e.g., a computer, is larger than that of a screen of the display device. In such a case, a user uses up/down/right/left keys and page up/down keys on a key pad or keyboard to move the displayed portion of the total document horizontally or vertically, so that the user sees the whole content of document. Also, in a system which supports a graphic user interface (GUI), a scroll bar may be used to move the displayed portion. The user may manipulate the scroll bar by use of an input device, e.g., a mouse or track ball, so that the displayed document portion is moved horizontally or vertically.

However, in the case that a simple document such as an image or document searched over the world-wide web (WWW) is to be glanced over, the manipulation of the keypad or the scroll bar may be an irksome task to the user. Thus, it is desired that the displayed document is automatically moved horizontally and vertically so that the user can take a glance at the total document.

SUMMARY OF THE INVENTION

To solve the above problem, an object of the present invention is to provide an automatic scrolling method for automatically moving a displayed portion of a document to show a document which is larger than a screen of an information device.

Additional objects and advantages of the invention will be set forth in part in the description which follows and, in part, will be obvious from the description, or may be learned by practice of the invention.

To achieve the above and other objects of the present invention, there is provided an automatic scrolling method including the steps of: (a) displaying a portion of the document located at the beginning of the document; (b) displaying another portion of the document shifted from a previously displayed portion by a predetermined horizontal displacement every predetermined period until the right end of the document is displayed; (c) displaying another portion of the document shifted by a predetermined vertical displacement and including a left end of the document when the right end of the document is displayed; and (d) repeating steps (b) and (c) until all of the contents of the document are displayed.

Preferably, the information device is a hand-held portable information terminal.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Figure 1:
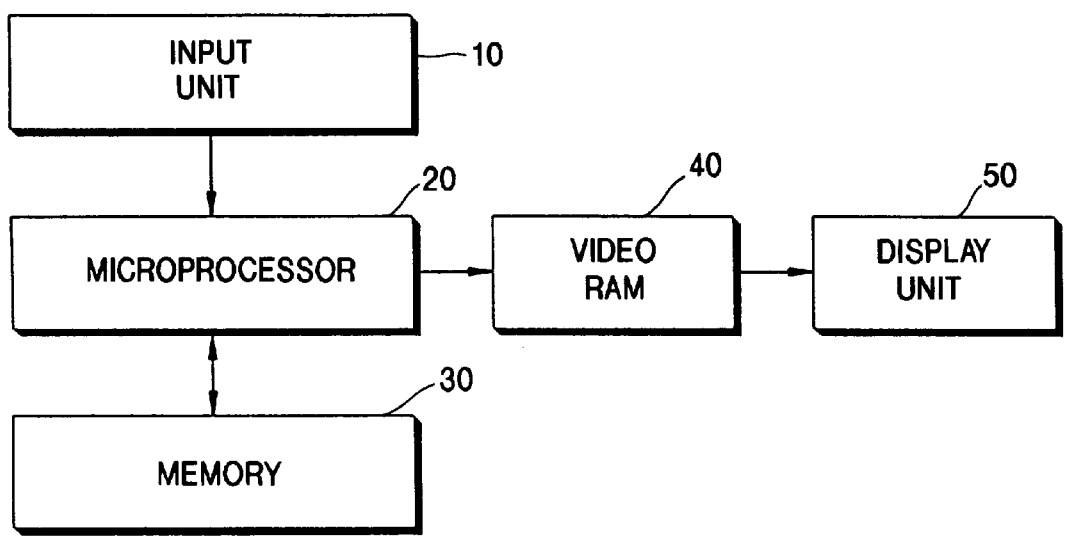
FIG. 1 is a block diagram of an information processing device to which a method according to an embodiment of the present invention is applied.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 1, an information processing device includes an input unit 10, a microprocessor 20, a memory 30, a video RAM 40, and a display unit 50 having a screen. In a preferred embodiment of the present invention, the information processing device may be a portable information terminal such as a palm-top computer or a personal digital assistant which has a small display unit and is suitable for receiving information through the world-wide web, for example.

The microprocessor 20 receives information data from a not shown recording medium or externally via a not shown modem in accordance with a user input which is received via the input unit 10. The microprocessor 20 stores the received information data in the memory 30. Also, the microprocessor 20 outputs all or a portion of the information data stored in the memory 30 to the video RAM 40 in response to a user input, so that the display unit 50 displays an image corresponding to the information data stored in the video RAM 40.

In the information processing device shown in FIG. 1, a user can input an automatic scrolling command through the input unit 10. When the automatic scrolling command is transferred to the microprocessor 20, the microprocessor 20 fetches a portion of the information data stored in the memory 30 periodically and outputs the fetched data to the video RAM 40.

Figure 2:
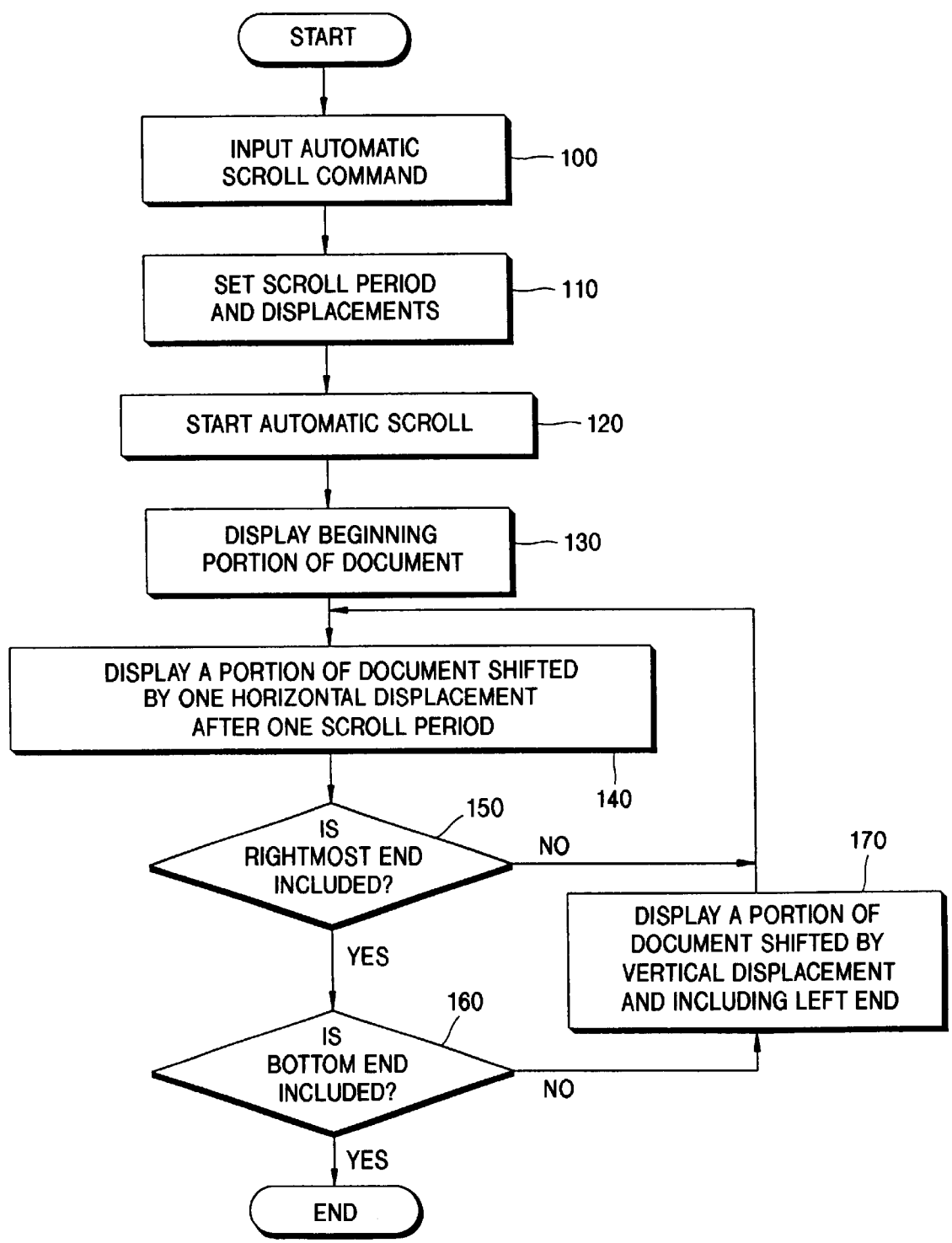
FIG. 2 is a flowchart illustrating an automatic scrolling method according to the embodiment of the present invention.

The automatic scrolling method according to the present invention will now be described in detail with reference to FIG. 2. The method of FIG. 2 generally includes selecting and setting steps 110 and 120, and automatic scrolling steps 130 through 170.

When a whole text or image is larger than a screen of the display unit 10 so that a total amount of information of the whole text or image cannot be displayed on the screen, the user inputs an automatic scroll command in step 100.

After inputting the automatic scroll command, the user sets a scroll period and horizontal and vertical displacements for automatically moving the contents of information to be displayed in step 110. The horizontal displacement may be selected arbitrarily among the range between an inter-pixel distance and a screen width. Also, the vertical displacement may be selected arbitrarily among the range between an inter-pixel distance and a vertical screen length.

Meanwhile, in an alternative of the present embodiment, the step of setting scroll periods and displacements may be omitted. In such an embodiment, default values which are set previously are used.

Next, the automatic scrolling is initiated in step 120.

When the automatic scrolling is initiated, the microprocessor 20 sets (0, 0) which is the leftmost and uppermost point in the document as a pointer, which indicates a reference point of a portion of the document which is to be displayed on the screen of the display unit 50. Then, the microprocessor 20 reads out information data of one screen size beginning from the pointer from the memory 30 and outputs such data to the video RAM 40. Thus, a portion of the document which corresponds to the read out information data is displayed on the screen of the display unit 50.

After one scroll period, the pointer is moved to the right by one horizontal displacement, in step 140, so that a portion of the document which is shifted by one horizontal displacement from that displayed in the step 130 is displayed on the screen. Meanwhile, in the case that the portion of the document to be displayed includes the rightmost end of the document, the actual displacement may be shorter than what was set in the step 110.

It is determined whether the screen has reached the end of a row, in step 150. That is, it is determined whether the portion of the document which is currently displayed includes the rightmost end of the document. If the displayed portion of the document does not include the rightmost end of the document, the procedure is returned to the step 140.

If it is determined in the step 150 that the displayed portion of the document does includes the rightmost end of the document, it is determined in step 160 whether the portion of the document which is currently displayed includes the bottom end of the document. If the displayed portion of the document does not include the bottom end of the document, the horizontal coordinate of the pointer is reset to zero and the vertical coordinate is incremented by the vertical displacement set in the step 110, in step 170. Then, the procedure is returned to the step 140. Accordingly, a portion of the document which is shifted by the vertical displacement and includes the left end of the document is displayed on the screen.

However, if the displayed portion of the document includes the bottom end of the document in the step 160, the procedure is terminated.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An automatic scrolling method for showing a document which is larger than a screen of an information device, the method comprising the steps of:
    (a) displaying a first portion of the document located at a beginning of the document;
    (b) automatically displaying second portions of the document shifted from respective previously displayed portions by a predetermined horizontal displacement at each of predetermined periods until a right end of the document is displayed in response to completing the displaying of the first portion,
    (c) automatically displaying a third portion of the document shifted by a predetermined vertical displacement and including a left end of the document in response to completing the displaying of the right end of the document; and
    (d) repeating said steps (b) and (c) until all contents of the document have been displayed.

2. The automatic scrolling method as claimed in claim 1, further comprising the step of setting the predetermined horizontal and vertical displacements prior to said step (b).

3. The automatic scrolling method as claimed in claim 1, wherein the information device is a hand-held portable information terminal.

4. The automatic scrolling method as claimed in claim 2, wherein:
    the predetermined horizontal displacement is between a horizontal inter-pixel distance and a width of the screen; and
    the predetermined vertical displacement is between a vertical inter-pixel distance and a length of the screen.

5. The automatic scrolling method as claimed in claim 1, wherein the predetermined horizontal and vertical displacements are default values.

6. The automatic scrolling method as claimed in claim 1, wherein in said step (b), if one of the second portions to be displayed includes the right end of the document, an actual horizontal displacement of the one second portion is less than the predetermined horizontal displacement.

7. An automatic scrolling method for displaying a document which is larger than a screen of an information device on the screen, the method comprising the steps of:
    (a) automatically shifting and displaying portions of the document by a predetermined horizontal displacement starting from a first side of the document until a second side of the document is displayed;
    (b) automatically displaying another portion of the document including the first side and shifted by a predetermined vertical displacement from the portions displayed in said step (a) in response to completing said step (a); and
    (c) repeating said steps (a) and (b).

8. The automatic scrolling method as claimed in claim 7, further comprising the step of:
    displaying a beginning portion including the first side of the document prior to said step (a);
    wherein said step (c) comprises the step of repeating said steps (a) and (b) until all contents of the document have been displayed.

9. The automatic scrolling method as claimed in claim 7, wherein said step (c) comprises the step of repeating said steps (a) and (b) until a bottom portion of the document is being displayed.

10. The automatic scrolling method as claimed in claim 7, wherein:
    the predetermined horizontal displacement is between a horizontal inter-pixel distance and a width of the screen; and
    the predetermined vertical displacement is between a vertical inter-pixel distance and a length of the screen.

11. The automatic scrolling method as claimed in claim 7, further comprising the step of setting the horizontal and vertical displacements by a user prior to said step (a).

12. The automatic scrolling method as claimed in claim 7, wherein the predetermined horizontal and vertical displacements are default values.

13. The automatic scrolling method as claimed in claim 7, wherein in said step (a), if one of the portions to be displayed includes the second end of the document, an actual horizontal displacement of the one portion is less than the predetermined horizontal displacement.

14. The automatic scrolling method as claimed in claim 7, wherein said step (a) comprises the step of shifting the portions of the document by the predetermined horizontal displacement at each of a plurality of predetermined scroll periods.

15. The automatic scrolling method as claimed in claim 14, further comprising the step of setting a value for the plurality of predetermined scroll periods by a user prior to said step (a).

16. The automatic scrolling method as claimed in claim 11, wherein said step (a) comprises the step of shifting the portions of the document by the predetermined horizontal displacement at each of a plurality of predetermined scroll periods, the method further comprising the step of setting a value for the plurality of predetermined scroll periods by a user prior to said step (a).

17. An information display device having a screen to display a document larger than the screen, comprising:
   a memory to store the document; and
   a processing unit to read the document from said memory, wherein said processing unit:
      automatically shifts and displays portions of the document by a predetermined horizontal displacement starting from a first side of the document until a second side of the document is displayed,
      automatically displays another portion of the document including the first side and shifted by a predetermined vertical displacement from the portions displayed by the predetermined horizontal displacement in response to completing the display of said second side, and
      repeatedly shifts and displays subsequent portions of the document by the predetermined horizontal displacement until the second side of the document is displayed and a subsequent portion of the document including the first side and shifted by the predetermined vertical displacement from the subsequent portions displayed by the predetermined horizontal displacement.

18. The information display device as claimed in claim 17, further comprising an input unit to enable inputs by a user of the horizontal and vertical displacements.

19. The information display device as claimed in claim 17, wherein said processing unit comprises:
   a microprocessor to receive the document from an external source, store the document in said memory and read various portions of the document from the memory to perform the horizontal and vertical displacements; and
   a video random access memory (RAM) to store the various portions of the document received from said microprocessor and output the various portions to the screen.

20. The information display device as claimed in claim 17, wherein said processing unit initially displays a beginning portion including the first side of the document, and performs the horizontal and vertical displacements until all contents of the document have been displayed.

21. The information display device as claimed in claim 17, wherein the information display device is a hand-held portable information terminal.

22. A scrolling method for showing a document which is larger than a screen of an information device, said document having a pair of edges and a pair of ends, comprising:
   displaying a first portion of the document which includes one of said pair of edges and one of said pair of ends;
   initiating an automatic scrolling sequence, said scrolling sequence defining a predetermined horizontal displacement, a predetermined vertical displacement and a predetermined viewing period, the automatic scrolling sequence comprising:
      repeatedly horizontally shifting respective next portions of the document by the predetermined horizontal displacement and displaying each of said next portions for a duration of the predetermined viewing period until the other of said pair of edges is displayed;
      vertically shifting and displaying a second portion of the document by the predetermined vertical displacement after the other of said pair of edges is displayed; and
      sequentially repeating the horizontal and vertical shifting and displaying until the other of said pair of ends is displayed.

23. A method of displaying a document which is larger than a screen of an information device, the method comprising:
   displaying a first portion of the document including a first edge and a first end of the document, the first edge spaced apart horizontally from a second edge of the document and the first end spaced apart vertically from a second end of the document;
   automatically displaying second portions of the document shifted from respective previously displayed portions by a predetermined horizontal displacement at each of predetermined periods until the second edge of the document is displayed;
   automatically displaying a third portion of the document shifted by a predetermined vertical displacement and including a first edge of the document after the second edge of the document is displayed; and
   automatically repeating the displaying the second portions and the third portion until all contents of the document have been displayed.

* * * * *